United States Patent
Koide

(10) Patent No.: US 6,762,803 B1
(45) Date of Patent: Jul. 13, 2004

(54) LIQUID CRYSTAL DISPLAY DEVICE AND METHOD OF MANUFACTURING THE SAME

(75) Inventor: Kiyotaka Koide, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/068,052

(22) PCT Filed: Aug. 28, 1997

(86) PCT No.: PCT/JP97/03018

§ 371 (c)(1),
(2), (4) Date: Apr. 29, 1998

(87) PCT Pub. No.: WO98/09191

PCT Pub. Date: Mar. 5, 1998

(30) Foreign Application Priority Data

Aug. 29, 1996 (JP) .............................................. 8-229071

(51) Int. Cl.[7] ........................ G02F 1/136; G02F 1/1333
(52) U.S. Cl. ............................ 349/43; 349/138; 349/44
(58) Field of Search ............................ 349/43, 51, 44, 349/138, 152, 156, 45, 49; 399/95, 99, 51, 138

(56) References Cited

U.S. PATENT DOCUMENTS

| | | | |
|---|---|---|---|
| 5,003,356 A | * | 3/1991 | Wakai et al. .................. 349/43 |
| 5,084,905 A | * | 1/1992 | Sasaki et al. .................. 349/43 |
| 5,719,647 A | * | 2/1998 | Fujikawa et al. ............. 349/51 |
| 5,877,830 A | * | 3/1999 | Shimada et al. ............. 349/113 |
| 5,893,621 A | * | 4/1999 | Sekiguchi ..................... 349/51 |

FOREIGN PATENT DOCUMENTS

| | | |
|---|---|---|
| JP | 59-97119 | 6/1984 |
| JP | 63-64023 | 3/1988 |
| JP | 3-212621 | 9/1991 |

* cited by examiner

*Primary Examiner*—Toan Ton
(74) *Attorney, Agent, or Firm*—Harness, Dickey & Pierce, P.L.C.

(57) ABSTRACT

A structure in which two substrates in a liquid-crystal display device are not easily short-circuited is used to prevent a display defect caused by a short circuit formed between upper and lower electrodes by insertion of conductive foreign matter. An insulating film 16 consisting of various insulators is formed on a wiring layer 12, a first electrode portion 13, a thin insulating layer 14, and a second electrode layer 15. The insulating film 16 entirely covers the surfaces of the wiring layer 12 and the MIM element, and part of the insulating film 16 is slightly inserted into the inner side of a pixel region. A portion of the insulating film 16 corresponding to a pixel contact portion 15b serves as an opening for assuring the electric conductivity between the MIM element and a pixel electrode 17. The peripheral portion of the pixel electrode 17 is formed to overlap the inner edge portion of the insulating film 16. The peripheral portion is designed to be in contact with the pixel contact portion 15b of the second electrode layer 15 through the opening of the insulating film 16.

24 Claims, 8 Drawing Sheets

LIQUID CRYSTAL DISPLAY DEVICE AND METHOD OF MANUFACTURING THE SAME

FIELD OF THE INVENTION

The present invention relates to a liquid-crystal display device and a method of manufacturing the same and, more particularly, to an inner surface structure of a substrate constituting a liquid-crystal panel.

DESCRIPTION OF THE RELATED ART

A liquid-crystal display device generally comprises a liquid-crystal panel in which two substrates having inner surfaces on which electrodes corresponding to a large number of pixel regions arranged on a display surface are arranged are formed to hold a liquid-crystal layer between the substrates. In order to drive the liquid-crystal display device, an electric field is applied to the liquid-crystal layer by the electrodes to change the optical characteristics of the liquid-crystal layer, so that various displays can be performed. In this case, wiring layers for applying a predetermined drive potential to the electrodes may be arranged in parallel.

In an active matrix liquid-crystal display device, active elements such as TFT (Thin Film Transistors) elements or MIM (Metal-Insulator-Metal) elements are connected to the wiring layers formed on the inner surfaces of element substrates. These active elements are connected to pixel electrodes formed in pixel regions, respectively.

Some liquid-crystal display devices capable of performing a color display have the following structure. That is, color resists or the like each having a predetermined pattern are formed on the inner surface of the opposite substrate opposing an element substrate on which the active elements are formed, so that a color filter in which coloring layers, i.e., red (R), green (G), and blue (B) layers are formed. The color filter is covered with an overcoat film, and an opposite transparent electrode consisting of an ITO (Indium-Tin Oxide) is formed.

In the above conventional liquid-crystal display device, a liquid-crystal layer is sealed between two substrates, and a predetermined voltage is applied across two opposite electrodes formed on the inner surfaces of both the substrates to change the orientation of liquid-crystal molecules. However, in steps in manufacturing the liquid-crystal display device, conductive foreign matter may be inserted between the two substrates or into the liquid crystal. In this case, the conductive foreign matter may be interposed between the electrodes formed on the two substrates to adversely affect an electric field to be applied to the liquid crystal, or a point defect may be generated by the short circuit between the electrodes.

Here, even if the conductive foreign matter is inserted into a pixel region to short-circuit the electrodes, only the corresponding pixel is not operated in the active matrix liquid-crystal display device, i.e., only a point defect is generated. However, if similar foreign matter is located above a wiring layer or an active element on an element substrate, the wiring layer and the opposite electrode may be short-circuited. In this case, a crossline-like line defect may be generated on the display surface. Unlike the above point defect, generation of such a line defect means that a liquid-crystal panel is defective. Therefore, the line defect considerably degrades the manufacturing yield of the liquid-crystal display device to seriously affect manufacturing steps or manufacturing cost.

In particular, even if abnormality is not detected in the manufacturing steps, such a defect caused by conductive foreign matter may be retroactively generated by the foreign matter moving in the panel after shipping. For this reason, the defect cannot be easily prevented by inspections in the manufacturing steps. Therefore, perfect countermeasures against the defect caused by foreign matter are necessary.

Therefore, the present invention has been made to solve the above problem, and has as its object to prevent a display defect caused by a short circuit between upper and lower electrodes by using a structure in which two substrates in a liquid-crystal display device are not easily short-circuited.

SUMMARY OF THE INVENTION

In order to solve the above problem, a means provided by the present invention is a liquid-crystal display device comprising two substrates which interpose a liquid-crystal layer therebetween, a wiring layer formed on at least one inner surface of the substrates, and a pixel electrode directly or indirectly connected to a connection portion of the wiring layer, characterized in that an insulating film is formed on a surface of the wiring layer.

According to this means, when the surface of the wiring layer is covered with the insulating layer, contact of conductive foreign matter to the wiring layer and a short circuit between the wiring layer and the opposite electrode through the foreign matter can be prevented, and a severe line defect can be prevented from being generated.

Here, the insulating film is preferably arranged to insulate the wiring layer and the pixel electrode from each other, and preferably has an opening for assuring the electric conductivity between the connection portion and the pixel electrode.

According to this means, since the insulating film is formed not only to insulate the surface of the wiring layer, but also to insulate the wiring layer and the pixel electrode from each other, the wiring layer and the pixel electrode are not in contact with each other except for the electric conductive portion between the connection portion and the pixel electrode. For this reason, degradation of a display state caused by the short circuit between the wiring layer and the pixel electrode can be prevented.

A MIM element is formed between the connection portion and the pixel electrode, and the insulating film preferably also covers the surface of the MIM element.

According to this means, since the insulating film also covers the surface of the MIM element, contact between the MIM element and conductive foreign matter and a short circuit between the MIM element and the opposite electrode through the foreign matter can be prevented.

A TFT element is formed between the connection portion and the pixel electrode, and the insulating film is preferably formed on the wiring layer connected to the TFT element.

According to this means, contact between the wiring layer connected to the TFT element and conductive foreign matter and a short circuit between the wiring layer and the opposite electrode through the foreign matter can be prevented.

The insulating film preferably has light-shielding properties.

According to this means, since a light-shielding member need not be arranged on a substrate on which a color filter is formed, manufacturing cost can be reduced, and the opposite electrodes need not be arranged with a high alignment precision.

In a method of manufacturing a liquid-crystal display device comprising two substrates which interpose a liquid-crystal layer therebetween, a wiring layer formed on at least one inner surface of the substrates, and a pixel electrode directly or indirectly connected to a connection portion of the wiring layer, after the wiring layer is formed on the inner surface of the substrates, an insulating film is formed to cover the surface of the wiring layer and a portion between the wiring layer and the pixel electrode, and then, the pixel electrode is formed such that the peripheral portion of the pixel electrode is arranged on the insulating film.

According to this means, the surface of the wiring layer can be covered with the insulating film, and the wiring layer and the pixel electrode can be insulated from each other by the insulating film. For this reason, the insulating properties between the opposite substrates and the insulating properties between the wiring layer and the pixel electrode can be assured.

In this case, after a MIM element connected between the connection portion and the pixel electrode is formed, the insulating film is preferably formed to also cover the surface of the MIM element.

DESCRIPTION OF THE PREFERRED EMBODIMENTS

Embodiments according to the present invention will be described below with reference to the accompanying drawings.

Figure 1:
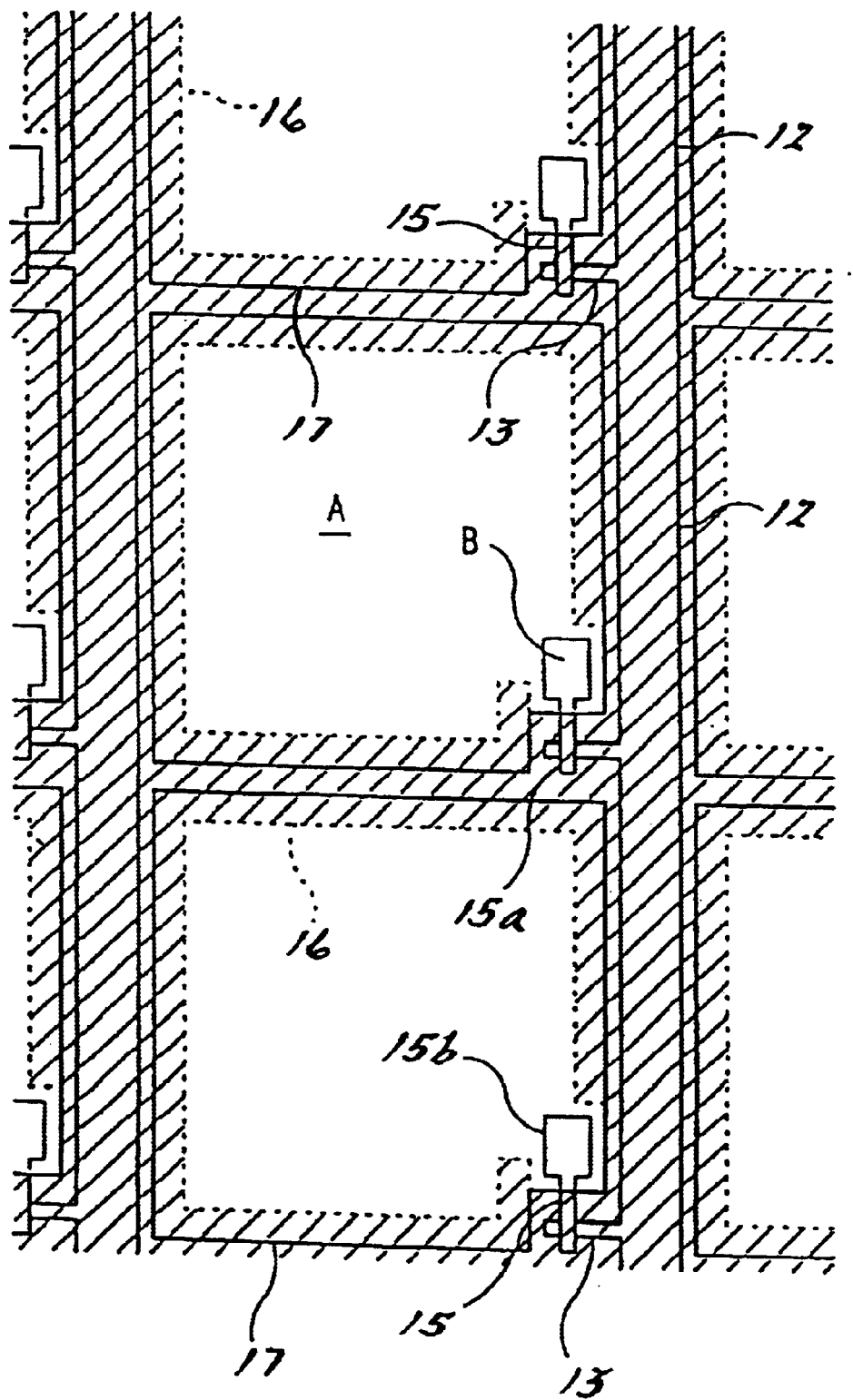
FIG. 1 is a schematic enlarged plan view showing a planar structure on an element substrate in an embodiment of a liquid-crystal display device according to the present invention.
Figure 2:
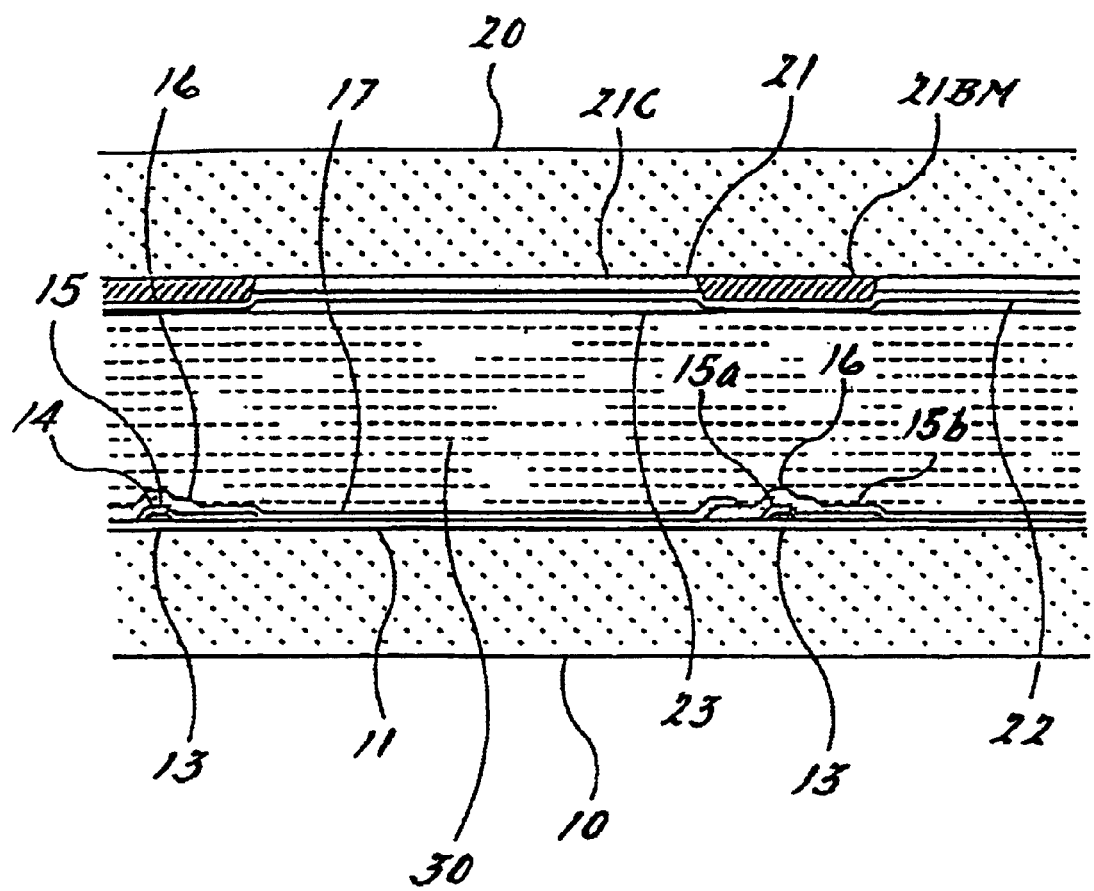
FIG. 2 is an enlarged longitudinal sectional view showing the sectional structure of this embodiment.

FIGS. 1 and 2 show an embodiment of a liquid-crystal display device according to the present invention. This embodiment exemplifies a case wherein the present invention is applied to an active matrix liquid-crystal display device having MIM elements respectively formed in pixel regions.

In this embodiment, as shown in FIG. 2, a transparent underlying layer 11 is formed on the surface of an element substrate 10. The underlying layer 11 is used to improve the adhesion between the element substrate 10 and a film such as a wiring layer formed on the element substrate 10. A wiring layer 12 constituted by a metal thin film is formed on the surface of the underlying layer 11 to have a predetermined pattern as shown in FIG. 1. A first electrode portion 13 formed to project to each pixel region is integrally formed with the wiring layer 12.

A thin insulating layer 14 formed by an anodic oxidation method is formed on the surfaces of the wiring layer and the first electrode portion 13, and a second electrode layer 15 is formed through the thin insulating layer 14. The second electrode layer 15 comprises an electrode portion 15a located immediately above the first electrode portion 13 and a pixel contact portion 15b which extends from the electrode portion 15a to largely overhang.

The first electrode portion 13, the thin insulating layer 14, and the electrode portion 15a of the second electrode layer 15 constitute a MIM element serving as a two-terminal active element consisting of metal-insulator-metal.

An insulating film 16 consisting of various insulators is formed on the wiring layer 12, the first electrode portion 13, the thin insulating layer 14, and the second electrode layer 15. The insulating film 16 entirely covers the wiring layer 12 and the surface of the MIM element as shown in FIG. 1. Part of the insulating film 16 is slightly inserted into the inner side of a pixel region.

Here, the insulating film 16 is formed on the second electrode layer 15 except for the surface of the pixel contact portion 15b, a portion corresponding to the pixel contact portion 15b is used as an opening for assuring the electric conductivity between the MIM element and a pixel electrode 17 (to be described later).

In each pixel region in which one MIM element described above is formed, the transparent pixel electrode 17 consisting of an ITO is formed. The peripheral portion of the pixel electrode 17 is formed to overlap the inner edge portion of the insulating film 16. The peripheral portion is designed to be in contact with the pixel contact portion 15b of the second electrode layer 15 through the opening.

As shown in FIG. 2, a color filter 21 constituted by coloring layers 21C each of which exhibits one color of red (R), green (G), and blue (B) and a black matrix layer 21BM formed between the coloring layers 21C is formed on the inner surface of an opposite substrate 20. A protective film 22 consisting of a transparent resin is adhered to the surface of the color filter 21. The protective film 22 is used to protect the color filter 21. An opposite electrode 23 consisting of an ITO formed in the form of a stripe is formed on the surface of the protective film 22. Here, the coloring layers in this embodiment are not limited to the three coloring layers which exhibit red, green, and blue, and coloring layers which exhibit cyan, magenta, and yellow may be used.

In addition, alignment films are formed on the element substrate 10 and the inner surface of the opposite substrate 20 by applying, and subjected to a rubbing process. A liquid-crystal layer 30 is arranged to be held between these orientation films.

In this embodiment, the insulating film 16 completely covers the wiring layer 12 and the surface of the MIM element. Even if conductive foreign matter is inserted between the element substrate 10 and the opposite substrate 20, there is no risk that the wiring layer 12, the MIM element, and the opposite electrode are in electric contact with each other. Therefore, a crossline-like line defect which is severe for a liquid-crystal display device can be prevented from being generated.

Since the insulating film 16 is interposed between the wiring layer 12 and the pixel electrode 17 except for a position where the pixel contact portion 15b of the second electrode layer 15 is in electric contact with the pixel electrode 17, the short circuit between the wiring layer 12 and the pixel electrode 17 and a leak current therebetween can be prevented from being generated.

Figure 3:
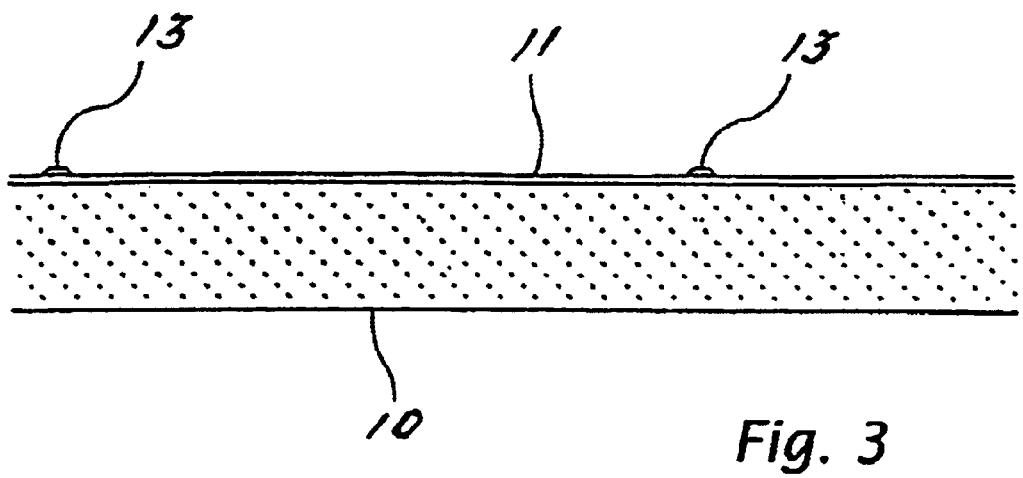
FIG. 3 is a schematic process drawing showing an embodiment of a method of manufacturing a liquid-crystal display device according to the present invention.

FIGS. 3 to 6 show main manufacturing steps of the element substrate 10 in the embodiment. As shown in FIG. 3, Ta is coated on the entire area of the surface of the element substrate 10 consisting of non-alkaline glass by a sputtering method, and is thermally oxidized to form an underlying layer 11 consisting of a Ta oxide. This underlying layer may be formed by RF-sputtering of a Ta oxide. Ta or a Ta alloy is coated on the surface of the underlying layer 11 again by a sputtering method. This coating is patterned by photolithography to form the wiring layer 12 (see FIG. 1, not shown in FIG. 3). Here, the first electrode portion 13 is integrally formed with the wiring layer 12 as described above.

Figure 4:
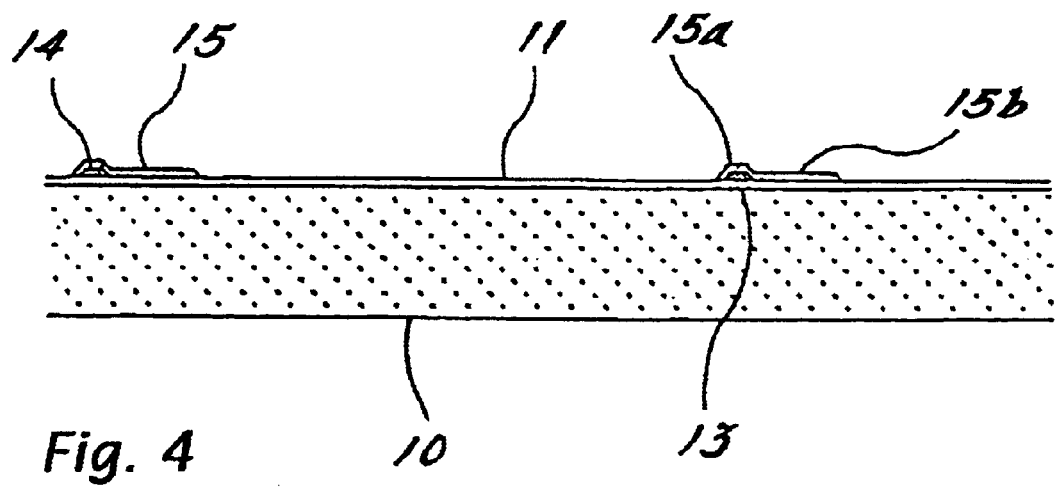
FIG. 4 is a schematic process drawing showing the embodiment of the method of manufacturing a liquid-crystal display device according to the present invention.

As shown in FIG. 4, the thin insulating layer 14 is formed on the surfaces of the wiring layer 12 and the first electrode portion 13 by an anodic oxidation method. The thin insulating layer 14 is formed in the following manner. That is, the element substrate 10 is dipped in an electrolytic solution, and a current flows between the wiring layer 12 and the opposite electrode in this electrolytic solution to oxidize the surface of the Ta film. Since this thin insulating layer 14 is to determine the electric characteristics of the MIM element, film forming conditions, a film thickness, and the like must be precisely set. After the thin insulating layer 14 is formed, the thin insulating layer 14 may be subjected to annealing (thermal process) as needed.

In addition, Cr is coated on the thin insulating layer 14 formed on the surface of the first electrode portion 13 by a sputtering method. Predetermined patterning is performed to the Cr film to form the second electrode layer 15. The second electrode layer 15, as shown in FIG. 1, has the electrode portion 15a formed to partially overlap the first electrode portion 13 and the pixel contact portion 15b to be in electric contact with the pixel electrode 17 (to be described later). The second electrode layer 15 may consist of aluminum, titanium, molybdenum, or the like.

Figure 5:
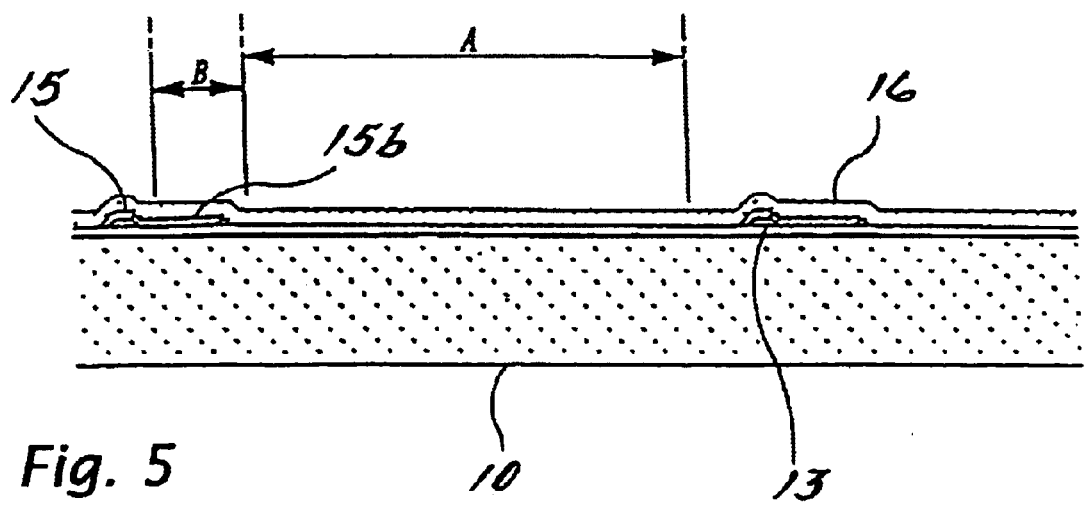
FIG. 5 is a schematic process drawing showing the embodiment of the method of manufacturing a liquid-crystal display device according to the present invention.

As shown in FIG. 5, the insulating film 16 having a predetermined thickness is formed on the surface of the element substrate 10. As this insulating film, an inorganic insulating film formed by a sputtering method or the like and consisting of a Ta oxide, a silicon oxide, a silicon nitride, an aluminum oxide, or the like is preferably used. The insulating film 16 is formed to have a film thickness which can assure insulating properties between the insulating film 16 and the wiring layer 12 or the like formed as an underlying layer. For example, a Ta oxide film preferably has about 1,000 Å or more, and a silicon oxide film preferably has about 400 Å or more. In general, the thickness of the insulating film 16 is set to about 400 to 5,000 Å. The insulating film 16 may consist of a polyimide resin, an acrylic resin, or the like.

The insulating film 16 formed as described above is patterned by a photolithographic process using a mask having a planar pattern which is almost the same as that of the transparent region (portion except for the region in which the black matrix layer 21BM is formed) of the color filter 21 on the opposite substrate 20 shown in FIG. 2, and a region A corresponding to the pixel region of the liquid-crystal display device in FIG. 5 and a region B serving as an opening corresponding to the pixel contact portion 15b of the second electrode layer 15 are removed.

Here, when the mask for forming the transparent region of the color filter is also used in the patterning of the insulating film 16, the number of masks used in the photolithographic process can be reduced, and manufacturing cost can be reduced.

Figure 6:
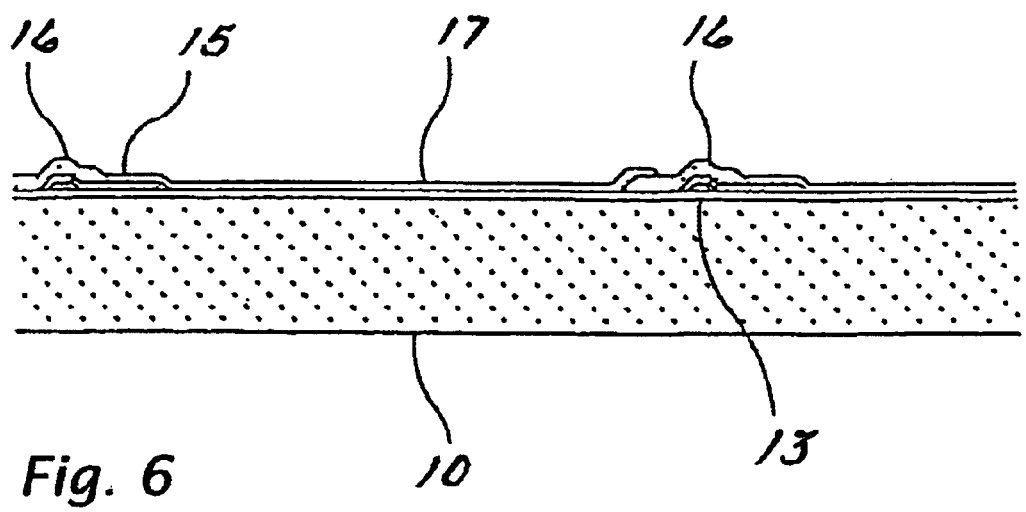
FIG. 6 is a schematic process drawing showing the embodiment of the method of manufacturing a liquid-crystal display device according to the present invention.

Finally, as shown in FIG. 6, an ITO is coated on the entire area of the resultant structure by a sputtering method and then patterned to form the pixel electrode 17. This pixel electrode 17 completely covers the region A from which the insulating film 16 is removed, and is adhered to the pixel contact portion 15b of the second electrode layer 15 in the region B. The pixel electrode 17 is formed such that the peripheral portion of the pixel electrode 17 is located on the inner edge portion of the portion (corresponding to the region A) from which the insulating film 16 is removed.

According to the manufacturing method, since the surfaces of the wiring layer 12 and the MIM element have been completely covered with the insulating film 16 in the formation of the pixel electrode 17, the pixel electrode 17 can be formed without risk that the pixel electrode 17 and the wiring layer 12 or the MIM element are short-circuited. As a result, the pixel electrode 17 can also be maximally formed in the region for forming the wiring layer 12, and an opening ratio can be increased.

Here, after the first electrode portion 13 and the insulating layer 14 are formed, the insulating film 16 is formed to expose the insulating layer 14, and the pixel electrode 17 may be formed on the insulating film 16 by, e.g., an ITO, to be connected to the insulating layer 14. In this case, since the second electrode layer and the pixel electrode are integrally formed with each other, patterning of the second electrode layer can be made unnecessary, and the manufacturing steps of the two-terminal active element can be partially omitted.

The insulating film 16 may be constituted by an insulating film having light-shielding properties. In this case, the black matrix layer 21BM need not be formed on the opposite substrate 20 shown in FIG. 2. For this reason, adhering between the element substrate and the opposite substrate does not require a high alignment precision. In addition, the structure of the opposite substrate can be simplified, and manufacturing cost can be reduced.

Figure 7:
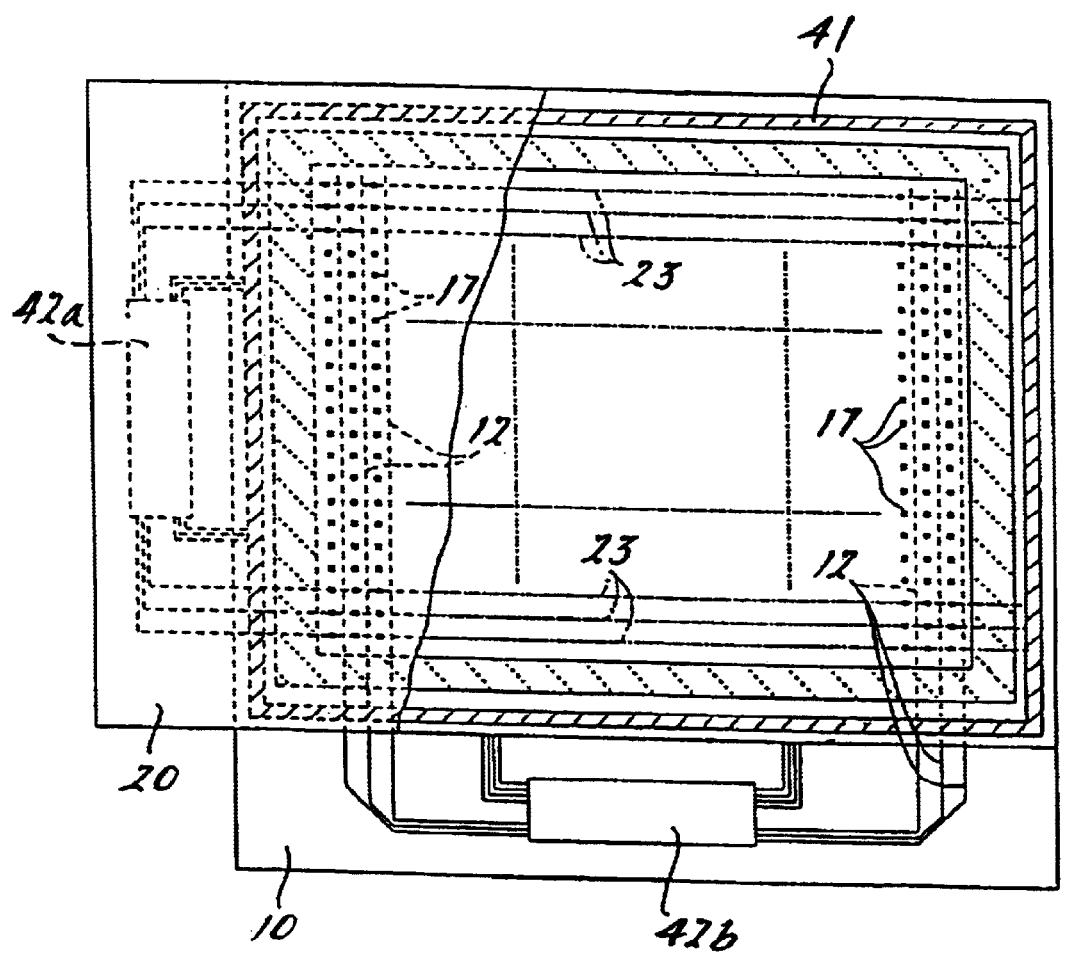
FIG. 7 is a schematic view showing the structure of a liquid-crystal display device according to the present invention.

The element substrate 10 and the opposite substrate 20 formed as described above are adhered to each other through a seal member 41, as shown in FIG. 7. A liquid crystal is injected into a liquid-crystal sealing region divided by the seal member to form the liquid-crystal layer 30, and peripheral circuit parts of drive circuits 42a and 42b are packaged, thereby constituting a liquid-crystal display device.

In the embodiment described above, the insulating film 16 is formed on an element substrate having MIM elements. However, according to the present invention, when a wiring layer and a liquid-crystal application electrode are formed on the inner surface of any one of an element substrate and an opposite substrate, the same effect as described above can be obtained by forming an insulating film on the wiring layer of the corresponding substrate.

An embodiment in which the present invention is applied to a matrix liquid-crystal display device comprising a TFT (Thin-Film Transistor) element as a three-terminal active element will be described below.

Figure 8:
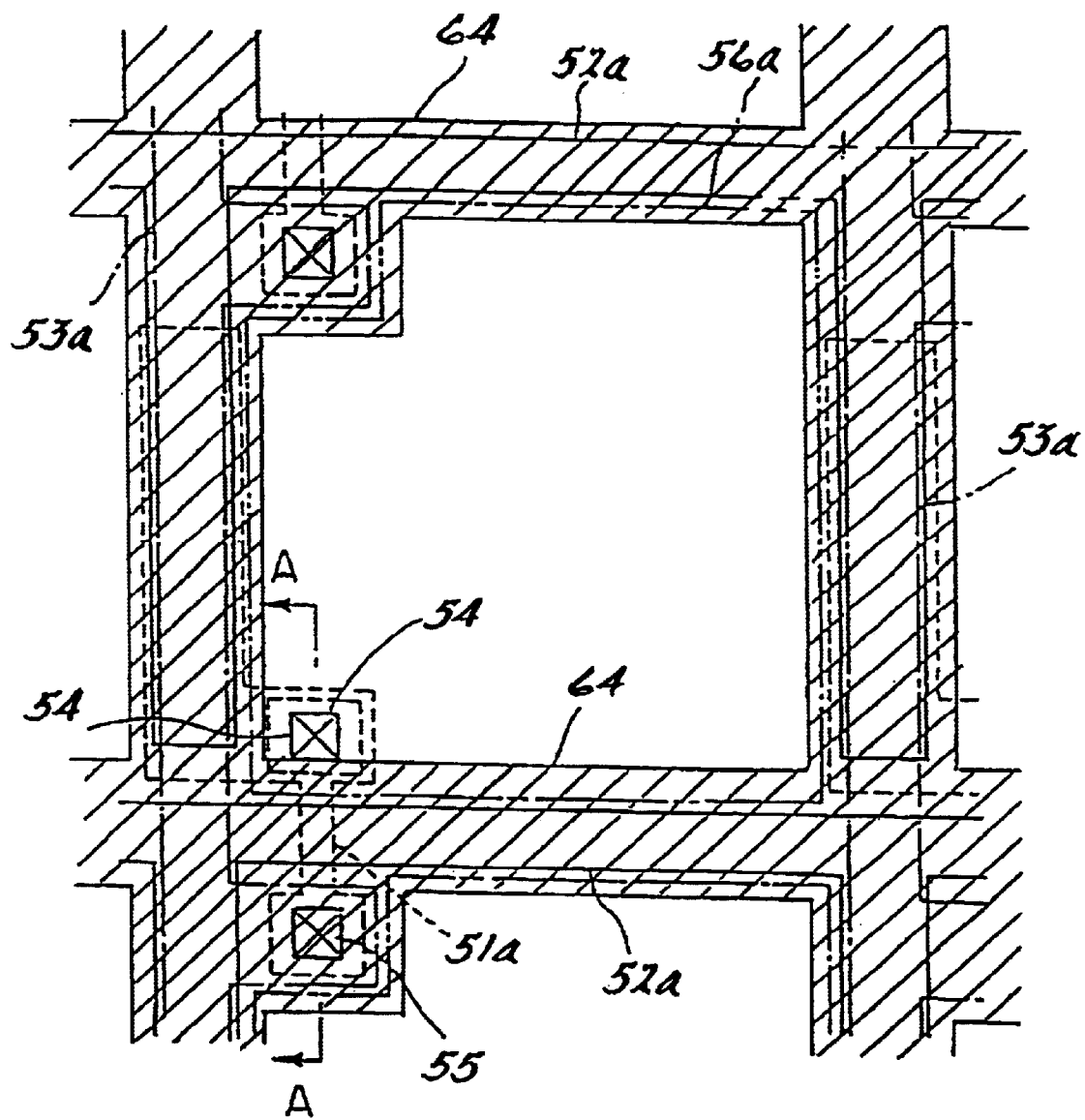
FIG. 8 is a schematic enlarged plan view showing a planar structure on an element substrate in an embodiment of a liquid-crystal display device according to the present invention.
Figure 9:
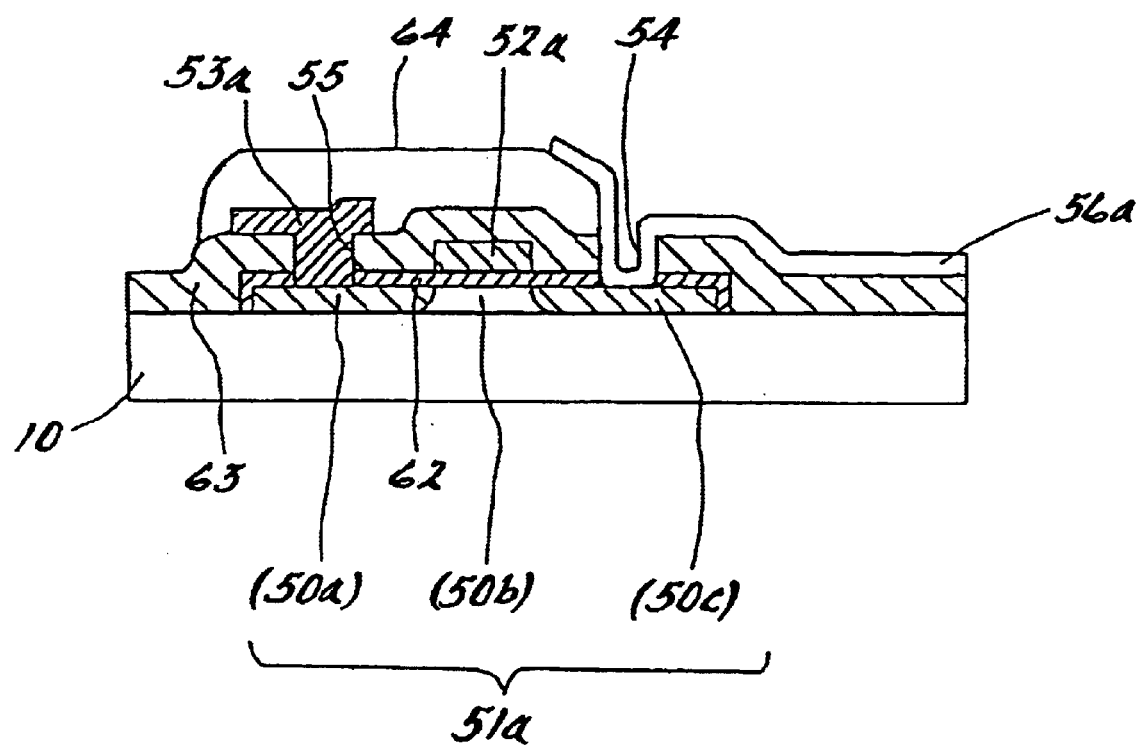
FIG. 9 is an enlarged longitudinal sectional view showing the sectional structure of this embodiment.

FIG. 8 is a plan view showing the brief structure of a pixel of a liquid-crystal display device, comprising a TFT (Thin- Film Transistor) element, as the liquid-crystal display device according to the present invention, and FIG. 9 is a sectional view showing the pixel along line A—A in FIG. 8.

A pixel portion will be described first. In FIG. 8, reference numeral 51a denotes a first polysilicon layer constituting an active layer (source region 50a channel region 50b drain region 50c) of the TFT. As shown in FIG. 9, a gate insulating film 62 is formed by thermal oxidation. Reference numeral 52a denotes a scanning line serving as a gate electrode of the TFT, and reference numeral 53a denotes a data line, formed to cross the scanning line 52a, for applying a voltage to be applied to a pixel electrode to the source region 50a of the TFT. The scanning line 52a and the data line 53a are formed by the second polysilicon layer and a conductive layer such as an aluminum layer, respectively.

Reference numeral 54 denotes a contact hole for connecting the pixel electrode 56a consisting of an ITO to the drain region 50c of the TFT of the first polysilicon layer 51a, and reference numeral 55 denotes a contact hole for connecting the data line 53a to the source region of the TFT of the first polysilicon layer 51a.

In FIG. 9 showing the section along line A—A line in FIG. 8, reference numeral 10 denotes a substrate such as a glass substrate, a quartz substrate, or a silicon substrate, and reference numeral 62 denotes a gate insulating film such as a silicon oxide film or the like formed on the surface of the first polysilicon layer 51a serving as the active layer of the TFT. The gate insulating film 62 is formed by thermal oxidation or the like. Reference numeral 63 denotes a first interlayer insulator constituted by an NSG film (silicate glass film being free from boron or phosphorus) or the like. The first interlayer insulator 63 is formed by a high-temperature CVD method and a low-temperature CVD method.

In this embodiment, an insulating layer 64 is formed to cover the upper portion of the channel region 50b, the scanning line 52a serving as the wiring layer and the data line 53a.

The insulating layer 64 is formed on the scanning line 52a and the data line 53a except for the peripheral portion of the contact hole for performing connection to the pixel electrode 56a (to be described later), and the insulating layer 64 is patterned such that the inner peripheral portion of the contact hole 54 partially overlaps the outer peripheral portion of the pixel electrode 56a.

In this embodiment, as the insulating layer 64, an inorganic insulating film formed by a sputtering method or the like and consisting of a Ta oxide, a silicon oxide, a silicon nitride, an aluminum oxide, or the like is preferably used. The insulating layer 64 is preferably used to have a film thickness which can sufficiently assure the insulating properties between the insulating layer 64 and the data line 53a. For example, a Ta oxide film preferably has about 1,000 Å or more, and a silicon oxide film preferably has about 400 Å or more.

The insulating layer 64 can prevent the pixel electrode 56a and the data line 53a from being short-circuited even if they are sufficiently close to each other, so that a defect in display can be prevented from being generated.

When a mask for forming the transparent region of a color filter (not shown) arranged to be opposite to the substrate 10 is used in the patterning of the insulating film 64, the number of masks used in the photolithographic process used when the liquid-crystal display device is manufactured can be reduced.

In this embodiment, when the insulating film 64 consists of a light-shielding material, a leak current can be prevented from being generated by light irradiated on the wiring layer of the TFT element or the region of the active layer, and a black matrix is formed on the element substrate. For this reason, a black matrix need not be formed on the opposite substrate, and adhering between the element substrate and the opposite substrate does not require a high alignment precision. In addition, the structure of the opposite substrate can be simplified, and manufacturing cost can be reduced.

Thereafter, the contact hole 54 passing through the first interlayer insulator 63 and the gate insulating film 62 is formed, so that the pixel electrode 56a consisting of an ITO is formed.

This embodiment describes the case wherein the ITO is used as the pixel electrode. However, the present invention is not limited to the embodiment, and a transparent electrode material consisting of a high refractory metal oxide such as SnO or ZnOx can also be used.

Figure 10A:
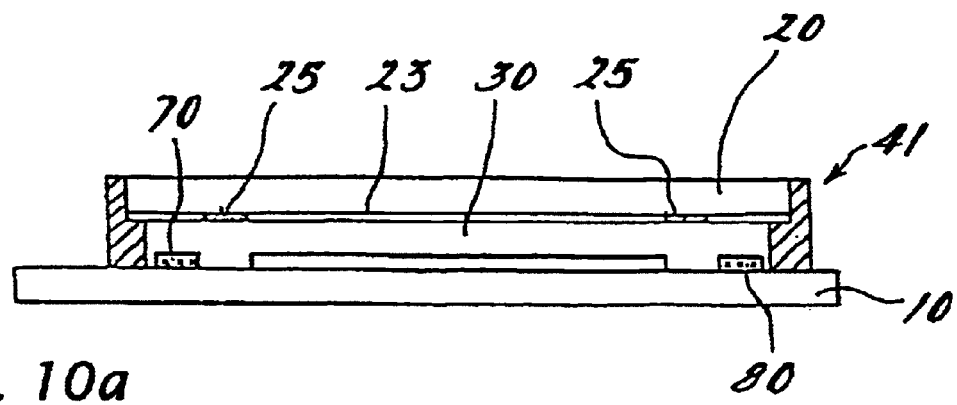
FIG. 10 is a schematic view showing the structure of a liquid-crystal display device according to the present invention.
Figure 10B:
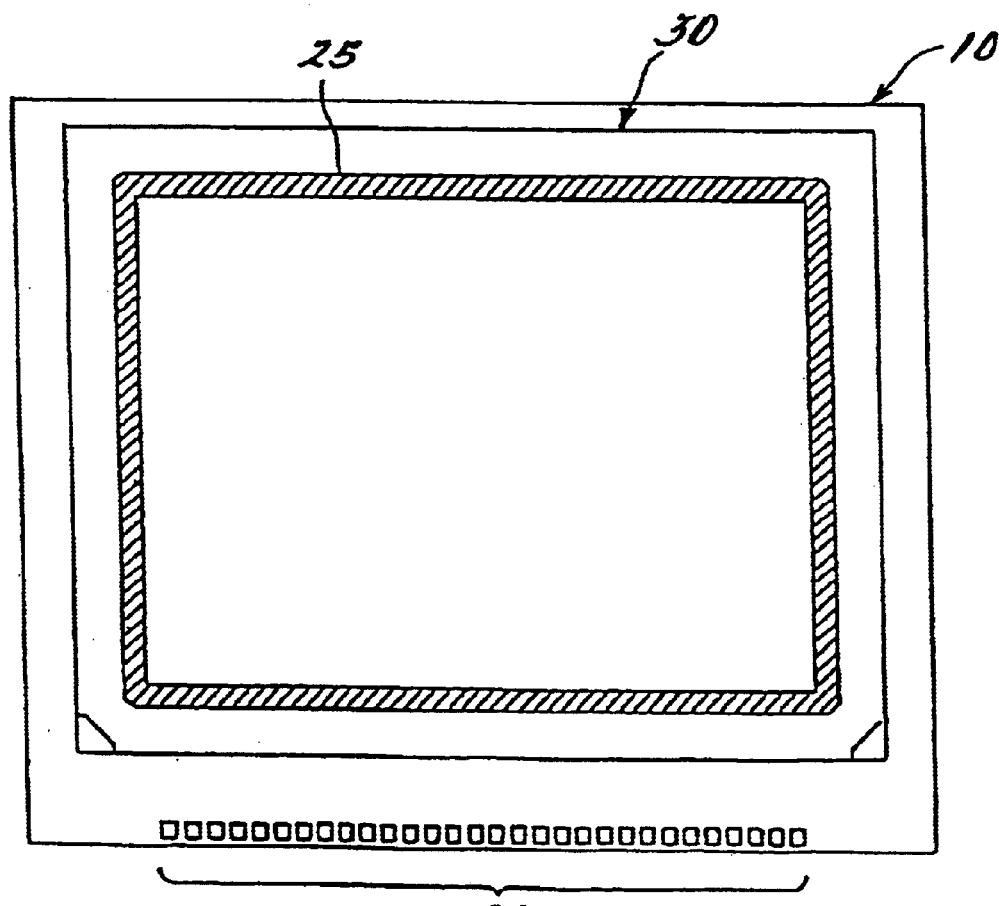

The element-side substrate having the above structure and an opposite electrode 23 arranged to be opposite to the element-side substrate are adhered to each other through a seal member 41, as shown in FIG. 10. Reference numeral 25 denotes a light-shielding layer formed on the opposite substrate 20 and constituted by a chromium layer or the like.

A liquid crystal 30 is injected into a liquid-crystal sealing region divided by the seal member 41, and a circuit substrate (not shown) for inputting a video signal or the like displayed in the pixel region is packaged on an input terminal portion 90, so that the liquid-crystal display device is constituted.

In this embodiment, transistors constituting peripheral circuits 70 and 80 for supplying drive signals to the TFT elements are constituted by so-called polysilicon TFTs which uses polysilicon layers as operation layers like the TFT elements for pixel driving. These transistors constituting the peripheral circuits are simultaneously formed on the substrate together with the TFT elements for pixel driving by the same process.

In this embodiment, since the insulating layer 64 is formed to cover the scanning line serving as a wiring layer, even if conductive foreign matter is inserted between the scanning line and the opposite electrode, the scanning line and the opposite electrode are not short-circuited. As a result, a defect caused by the conductive foreign matter can be prevented from being generated.

Although a liquid-crystal display device is described as a transparent liquid-crystal display device in each of the embodiments of the present invention, the present invention is not limited to these embodiments. The present invention may be applied to a reflective liquid-crystal display device in which a reflective layer is formed on one of an element-side substrate and an opposite substrate.

The present invention described above can provide a structure suitable for preventing a display defect caused by a short circuit between upper and lower electrodes by using a structure in which two substrates of a liquid-crystal display device are not easily short-circuited, and a method of manufacturing the same.

What is claimed is:

1. A liquid-crystal display device comprising:
    a first substrate having an inner surface;
    a second substrate having an inner surface;
    a liquid-crystal layer disposed between said first and second substrates;
    a wiring layer formed on at least one of said inner surfaces of said first and second substrates;
    a pixel electrode;

an active element disposed between the wiring layer and the pixel electrode, the pixel electrode connected to a connection portion so as to connect to the active element;

an insulating film overlapping the wiring layer and the active element except for the connection portion so that the connection portion is free of the insulating film, the insulating film underlying a peripheral portion of the pixel electrode except for a portion of the pixel electrode connected to the connection portion and a central portion of the pixel electrode so that an underside of the central portion of the pixel electrode does not overlap said insulating film, and the central portion of the pixel electrode extends continuously from the connection portion without underlying the insulating film.

2. The liquid-crystal display device of claim 1 wherein said insulating film is insulatingly disposed between said wiring layer and said pixel electrode.

3. The liquid-crystal display device of claim 2 wherein said insulating film includes an opening through which said pixel electrode is coupled to said wiring layer.

4. The liquid-crystal device of claim 3, wherein said insulating film is inserted into an inner side of said pixel region.

5. The liquid-crystal display device of claim 2 further comprising a MIM element coupled between said wiring layer and said pixel electrode.

6. The liquid-crystal display device of claim 5 wherein said insulating film covers a surface of said MIM element.

7. The liquid-crystal device of claim 6, wherein said insulating film is inserted into an inner side of said pixel region.

8. The liquid-crystal device of claim 5, wherein said insulating film is inserted into an inner side of said pixel region.

9. The liquid-crystal device of claim 2, wherein said insulating film is inserted into an inner side of said pixel region.

10. The liquid crystal display device of claim 1 wherein said insulating film has light shading properties.

11. The liquid crystal device of claim 10, wherein said insulating film is inserted into an inner side of pixel region.

12. The liquid-crystal device of claim 1, wherein said insulating film is inserted into an inner side of said pixel region.

13. A method of forming a liquid-crystal display device comprising:

providing a first substrate having an inner surface;

providing a second substrate having an inner surface;

forming a wiring layer and an active element on at least one of said inner surfaces of said first and second substrates;

forming an insulating film on the wiring layer and the active element except for a connection portion such that the connection portion is free of the insulating film; and forming a pixel electrode that is connected to the connection portion so that the pixel electrode is connected to the active element;

wherein the active element is disposed between the wiring layer and the pixel electrode, the insulating film underlies a peripheral portion of the pixel electrode except for a portion of the pixel electrode connected to the connection portion and a central portion of the pixel electrode so that an underside of the central portion of the pixel electrode does not overlap said insulating film, and the central portion of the pixel electrode extends continuously from the connection portion without underlying the insulating film.

14. The method of claim 13 further comprising:

connecting a MIM element to said wiring layer and said pixel electrode and forming said insulating film so as to cover a surface of said MIM element.

15. A substrate with an active element, comprising:

a base member;

a wiring layer formed on the base member;

a pixel electrode;

an active element disposed between the wiring layer and the pixel electrode, the pixel electrode connected to a connection portion so as to connect to the active element;

an insulating film overlapping the wiring layer and the active element except for the connection portion so that the connection portion is free of the insulating film, the insulating film underlying a peripheral portion of the pixel electrode except for a portion of the pixel electrode connected to the connection portion and a central portion of the pixel electrode so that an underside of the central portion of the pixel electrode does not overlap said insulating film, and the central portion of the pixel electrode extends continuously from the connection portion without underlying the insulating film.

16. A substrate with an active element according to claim 15, wherein the thickness of the insulating film is 400 angstrom and 1000 angstrom.

17. A substrate with an active element according to claim 15 wherein the insulating film comprises a material selected from the group consisting of Ta oxide, silicon oxide, silicon nitride, aluminum oxide, polyimide, and acrylic resin.

18. A substrate according to claim 15 further comprises an insulator disposed on the connection portion of the wiring layer.

19. A substrate according to claim 15 wherein the base comprises an underlying layer for improving the adhesion between the base member and elements formed thereon.

20. A substrate according to claim 19 wherein at least a center portion of the pixel electrode is formed on the underlying layer, and a peripheral portion of the pixel electrode is formed underneath the insulating film.

21. A substrate according to claim 15, further comprises a second electrode layer, coupled to the pixel electrode, for connecting the wiring layer and the pixel electrode.

22. A substrate according to claim 15, wherein the insulating film having light shielding property.

23. A liquid-crystal display device according to claim 22 further comprises a driving circuit mounted on at least one of the first and the second substrate.

24. A liquid-crystal display device comprising:

a first substrate;

a second substrate opposing the first substrate; and a liquid-crystal layer disposed between said first and second substrates, wherein at least one of the first and the second substrate comprises the substrate defined in claim 15.

* * * * *